J. L. G. DYKES.
TIRE BAND STRETCHING MACHINE.
APPLICATION FILED SEPT. 29, 1917.

1,370,101.

Patented Mar. 1, 1921.
3 SHEETS—SHEET 2.

J. L. G. DYKES.
TIRE BAND STRETCHING MACHINE.
APPLICATION FILED SEPT. 29, 1917.
1,370,101.
Patented Mar. 1, 1921.
3 SHEETS—SHEET 3.
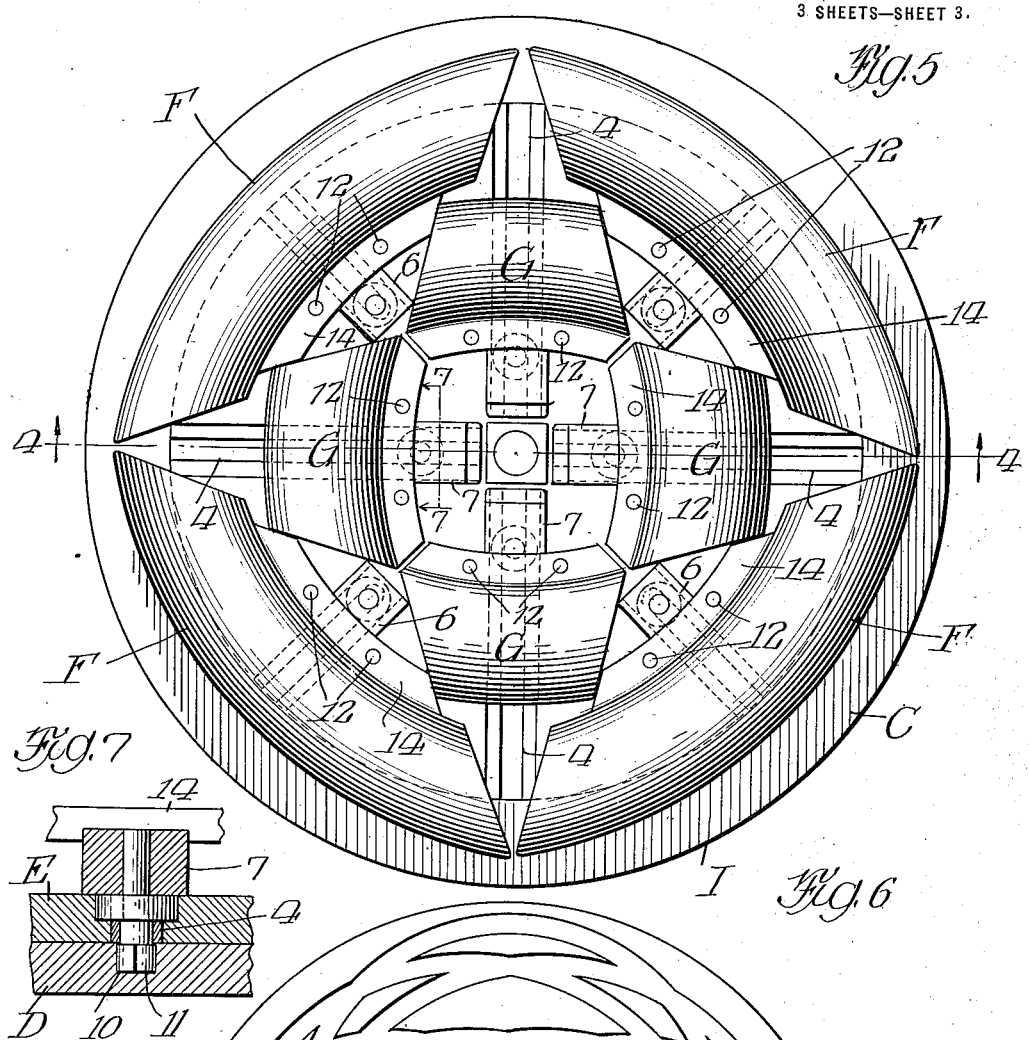
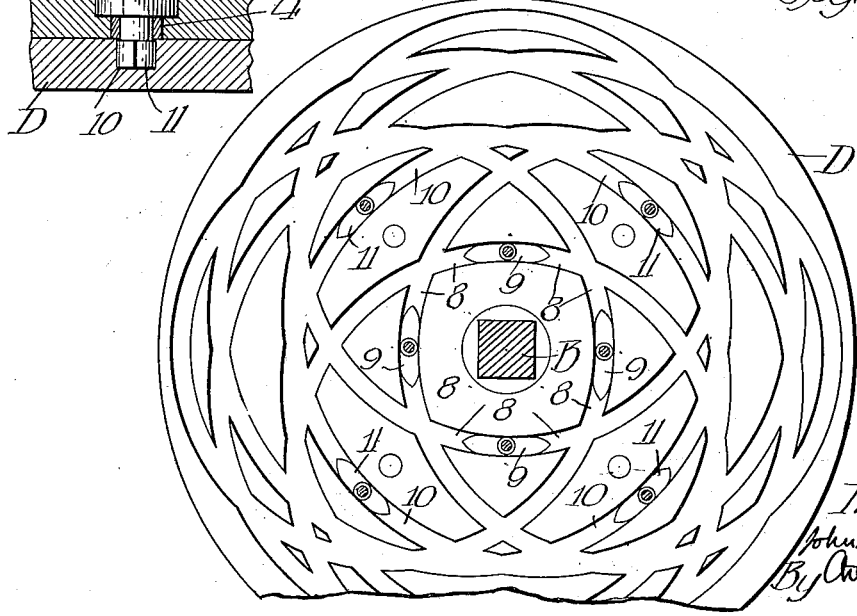
Inventor
John L. G. Dykes
By Arthur L. Evans
Atty.

UNITED STATES PATENT OFFICE.

JOHN L. G. DYKES, OF CHICAGO, ILLINOIS, ASSIGNOR TO ERNEST HOPKINSON, OF NEW YORK, N. Y.

TIRE-BAND-STRETCHING MACHINE.

1,370,101.                Specification of Letters Patent.         Patented Mar. 1, 1921.

Application filed September 29, 1917. Serial No. 193,977.

*To all whom it may concern:*

Be it known that I, JOHN L. G. DYKES, a citizen of the United States of America, and resident of Chicago, Cook county, Illinois, have invented a certain new and useful Improvement in Tire-Band-Stretching Machines, of which the following is a specification.

My invention relates to machines for use in making pneumatic tires by the method claimed broadly in my prior application No. 184,197, and which involves, first, the making of a band of fabric and rubber, second, the stretching of this band on a mandrel, causing it to assume approximately the shape and form desired for the pneumatic tire, and, third, the vulcanizing of the stretched band on the same mandrel. This method can be practised in various ways, and the machinery may be of any suitable character. In accordance with my present improvement, however, the sectional mandrel on which the band is stretched is removable from the machine, so that another mandrel can be inserted for the stretching of another band. In this way, a plurality of mandrels can be used interchangeably on one and the same machine, and while one or more mandrels are in use for vulcanizing purposes, in suitable molds or hydraulic presses for that purpose, another mandrel can be in use on the machine for stretching another band. With this method, therefore, the stretching machine can be kept busy, and the successive stretching of bands is not delayed by the vulcanizing operations. Also, the vulcanizing operation can be carried on to better advantage, by separate and independent instrumentalities which could not be conveniently combined with the stretching machine.

To these and other useful ends, therefore, my invention consists in matters hereinafter set forth and claimed.

In the accompanying drawings:

Fig. 3 is a vertical section on line 3—3 in Fig. 2.

Fig. 5 is a plan of the machine in the condition shown in Fig. 4.

Fig. 6 is a plan of the disk or cam-plate by which the sections of the mandrel are operated.

Fig. 7 is an enlarged detail section on line 7—7 in Fig. 5.

Fig. 8 is a detail section on line 8—8 in Fig. 2.

Figure 2:
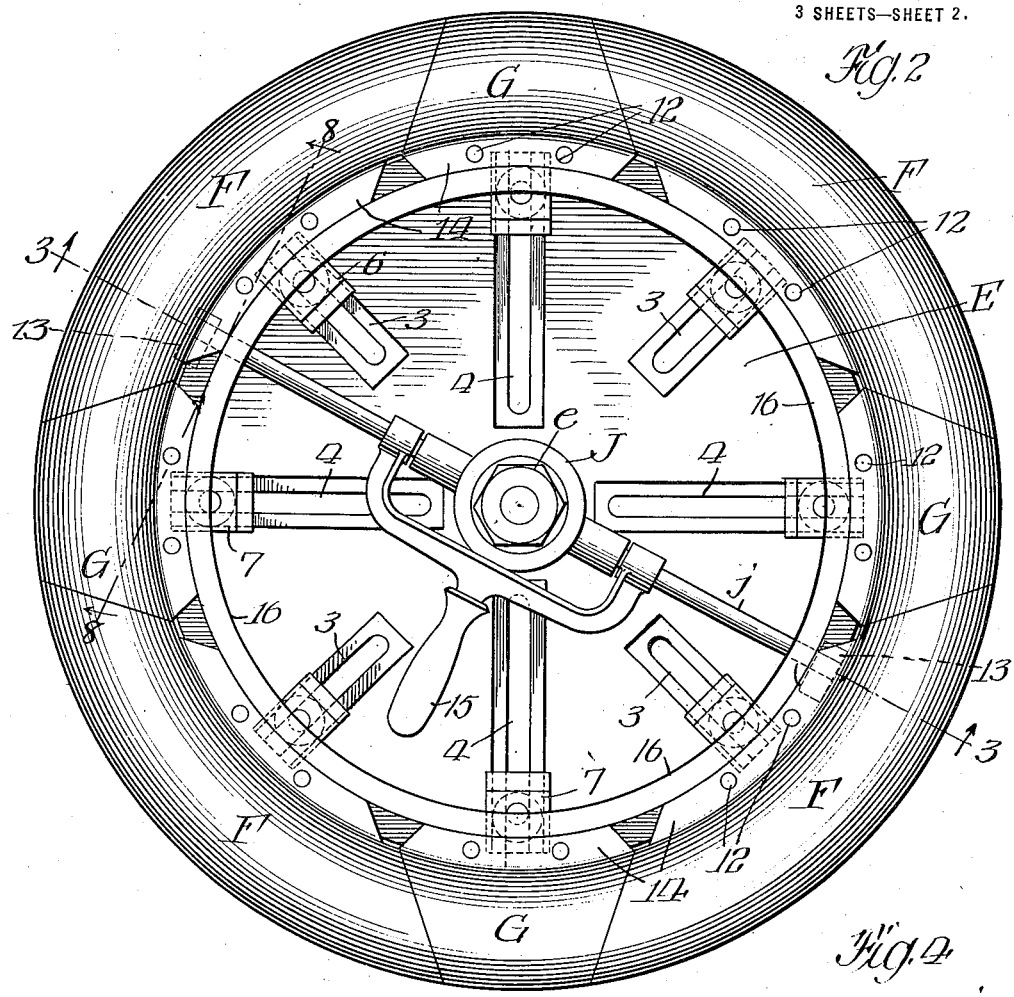
Fig. 2 is a plan of said machine, the device for removing the mandrel being omitted in Fig. 1 for convenience of illustration.

As thus illustrated, my invention comprises a suitable frame or body A provided at its upper end with a vertical post or pivot B upon which is mounted the rotary head or turn-table C, the latter being supported by ball-bearings $c$ or any other suitable means. The post B is held against rotation by a set-screw $b$ or any other suitable device. The underside of the head C is provided with bevel gear-teeth 1 which engage the double pinion 2, the latter being suitably mounted to rotate about a horizontal axis. The top of the head C is provided with a flat disk or cam-plate D, secured thereto by bolts $d$ or by any suitable means. A flat plate or disk E is rigidly secured to the top of the post B, by a clamping nut $e$ on the upper end of said post, and is provided with relatively short radial guideways 3 and relatively long radial guideways 4 for the slides 6 and 7 which are movable therein toward and away from the vertical axis of the rotary cam disk. Said disk or cam-plate D is provided with a plurality of circular cam grooves 8 for the slides 7, the latter having pivoted oblong pieces 9 which travel in said grooves. The circular grooves come close to the rotary axis of the machine at their inner sides, and at their outer sides are close to the outer edges of the cam-plate. The other four circular grooves 10 are less eccentric to the axis of rotation, and are engaged by the pivoted oblong pieces 11 of the slides 6, whereby the slides 6 and 7 are moved toward and away from the axis of the machine by the rotation of the cam-plate. Obviously, the slides 7 have a greater range of movement than the slides 6, by reason of the shape and location of the cam-grooves on the cam-plate. Said slides are each provided with a suitable number of vertical pins 12 which extend upward therefrom to receive the alternate mandrel sections F and intermediate mandrel sections G, the latter being shorter than the other sections. It will be seen that the mandrel sections F are beveled on the inside at their ends, and that the relatively short intermediate sections G are beveled outside at the ends thereof, so that the different sections fit together to provide a ring or annular mandrel. The sections G are, therefore wedge-shaped, when viewed from above, and the beveled end surfaces which form the wedge converge outward and away from the axis of the mandrel, so that each wedge shaped section G tends, when in use, to slip backward, and thus the sections are easily removed from the finished tire casing. In cross-section, it will be seen, this mandrel has substantially the shape desired for the cross-sectional contour of the pneumatic tire. When the disk or cam-plate D is rotated, the sections G move back quickly to the positions in which they are shown in Fig. 5, while the larger sections F move more slowly and to a less extent to the positions shown in Fig. 5, so that in effect the mandrel is contracted. Further rotation of the head C and the cam-plate D will then return the mandrel sections to the positions in which they are shown in Fig. 2, sections G being crowded like wedges tightly between the sections F, whereby the mandrel is expanded to its maximum diameter.

Figure 4:
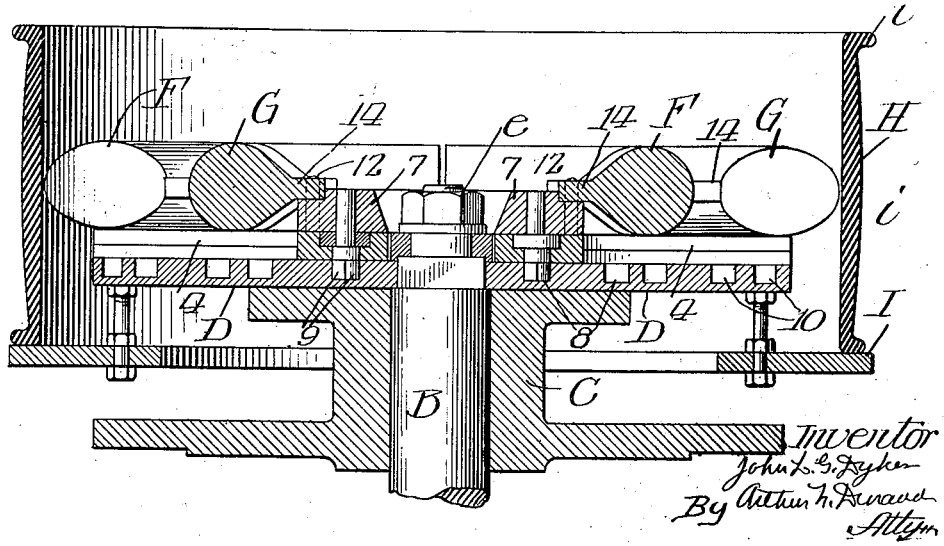
Fig. 4 is a vertical section on line 4—4 in Fig. 5.

In use, the band H, built up in any suitable manner from fabric and rubber, is supported edgewise upon the stationary table 1 of the machine, so that the mandrel is about midway between the upper and lower edges of said band, the mandrel having been contracted in the manner shown in Figs. 4 and 5. The machine is then started, and the rotation of the head C and the cam-plate D causes the expansion of the mandrel, so that the sections gradually assume the positions in which they are shown in Fig. 2, thereby stretching the band and causing it to conform to the mandrel in the manner shown in Figs. 1 and 3. This, it will be seen, is because only the tread or central portion of the band is stretched, the rim portions $i$ being left unstretched, so that the tread gradually assumes a greater diameter than the beads or rim portions of the band, with the result that the latter is stretched into the shape and condition and size and form desired for the pneumatic tire. The mandrel with the stretched band thereon is removable, as follows:—The mandrel sections are removable upwardly from the pins 12, and before the mandrel is placed in position on the machine, a device for lifting the mandrel is preferably applied to the machine. Said device comprises a hub portion J which receives the nut $e$ and which is provided with oppositely arranged rock-shafts $j$ to the outer ends of which are secured the cams 13 (see Figs. 3 and 8), these cams resting upon the plate E and being disposed immediately under the inner portions 14 of the mandrel sections. The rock-shafts $j$ are connected together by a handle 15, and when this handle is rocked about the horizontal axis provided by the shaft $j$ the cams 13 are rocked to force the mandrel upward from the machine. In order that the sections of the mandrel may not be disarranged, a ring 16 is preferably fitted inside the mandrel, after the latter is fully expanded, and when the mandrel is removed the strain or tension under which the fabric and rubber of the band have been placed will hold the sections of the mandrel tightly against the outer side of this ring, so that the sections of the mandrel will be retained in their proper and relative positions. The mandrel with the stretched band thereon can then be placed in a molding machine or hydraulic press for the purpose of vulcanizing the rubber of the stretched band, thereby to cause the stretched band to retain the shape and form desired for the pneumatic tire. It will be understood, of course, that the vulcanizing operation can be accomplished by any suitably known or approved means.

With this method, therefore, the sectional mandrel is removed as soon as the band is stretched, and another mandrel can be inserted in the machine. Another band is placed on the machine and this band is then stretched while the previous band is being vulcanized. Obviously, therefore, the one machine can be kept busy successively stretching bands, and the vulcanizing operation does not interfere in any way with the constant use of the machine for stretching purposes. Several mandrels can be provided, of the kind shown and described, and these mandrels can be used interchangeably on one and the same machine. The machine can be employed in conjunction with several hydraulic presses, and while several stretched bands are being vulcanized, other bands are being successively stretched on the one machine.

The cam mechanism shown for operating the sections of the mandrel is powerful and effective for this purpose. and the oblong form of the pivoted shoes or engaging pieces 11 prevents them from taking the wrong course where the cam-grooves cross each other, it being observed that in some places these grooves by crossing each other form fairly wide openings in the sides of the grooves, so that perfectly round engaging pieces would be liable to be diverted into the wrong groove or channel. The oblong pieces 11, however, move endwise in their allotted grooves and are too long to admit of their being deflected from one groove or channel to another, where the grooves cross each other, and thus the desired mode of operation is insured for the different sections of the mandrel.

The handle 15 serves not only to operate the device by which the mandrels are forced upward from the machine, but also as the means for lifting said device onto and off the machine. In some cases, of course, the mandrel, with the stretched band thereon, might be lifted off easily by hand, by grasping the rubber and fabric stretched on the mandrel, but the mandrels are necessarily of some weight, and especially those for large tires. Furthermore, the mandrel-sections will bind on the vertical pins 12, and some force is necessary to lift the mandrel from these pins which connect the mandrel sections with the operating mechanism. Any suitable means can be employed for this purpose, but the cams 13, when rocked by the handle 15, will exert a powerful upward pressure on the bottom of the mandrel, sufficiently to lift the mandrel and the stretched band thereon until the mandrel-sections are detached from said pins. Then the mandrel and the stretched band thereon can be carried to the hydraulic press or vulcanizing machine in any suitable manner.

The operating mechanism rotates about a vertical axis, as previously explained, and the cam-plate having the circular cam-groove in the upper surface thereof can be rotated always in one direction, if desired, it being observed that when the mandrel sections are pushed outward the cam-grooves are then all in position to retreat the mandrel-sections by further rotation of the cam-plate in the same direction. Of course, though, the rotation of the cam-plate can be reversed, after the mandrel-sections have reached their outer positions, or when it is desired to retract the mandrel-sections, after a fresh mandrel is placed on the machine, or the slides 6 and 7 can be retracted after one mandrel is removed, and the sections of another mandrel can then be applied to the pins carried by said slide. Obviously, therefore, the machine can be manipulated or handled in different ways, depending upon the circumstances or conditions.

The band H can be of any suitable thickness, and is built up by compressing layers of rubber and fabric, the latter being preferably cut on the bias so that the band will stretch. With this method, the sectional expansible mandrel upon which the tire is formed, by the expansion of the mandrel, is also used in vulcanizing the tire, whereby the tire does not leave the mandrel upon which it was formed until after the product is finished. My present invention, therefore, is concerned with the stretching and vulcanizing of the bands of fabric and rubber, and is designed to provide a machine which will stretch the bands in a satisfactory manner and having operating mechanism from which the sectional mandrel is temporarily detached while it (the mandrel) is in use for vulcanizing purposes. Of course, when the mandrel is disconnected from the operating mechanism, the segmental sections thereof are separable, and after the tire is vulcanized the different sections of the mandrel may be removed by hand, or in any suitable manner. Preferably, as explained, the mandrel (with the stretched band thereon) is entirely removed from the machine for the vulcanizing of the tire, so that the operating mechanism is then available for expanding another mandrel. But it will be understood that for the broader purposes of my invention, the vulcanizing can be done by means of a mold or press located in any position to receive the mandrel and tire, after the mandrel is temporarily detached from the operating or expanding mechanism. Obviously, therefore, the invention is not limited to the exact construction and arrangement shown and described.

The mandrel sections F and G, it will be seen, are of such shape that, when clamped in a mold, they will be retained in expanded position, against the tension of the stretched fabric and rubber, even without the ring 16, but to make the transfer from the stretching machine to the vulcanizing press, the ring 16, or any other suitable means, is necessary in order to retain the mandrel sections in position against the constant tendency of the stretched band or tire casing to contract or spring back to its original diameter. The mandrel sections are, therefore, entirely detachable from the operating mechanism, so that during compression or vulcanization the mandrel is entirely disconnected from the operating mechanism by which it was expanded to stretch the band.

With the construction shown and described, the mandrel sections are of such shape that the tire casing is formed with a clencher-base of less width than the portion between the base and the tread, which means that the base is narrower than the body portion of the tire, the two clencher rim portions being brought nearly together to form a narrow slot in the base of the tire casing.

Figure 1:
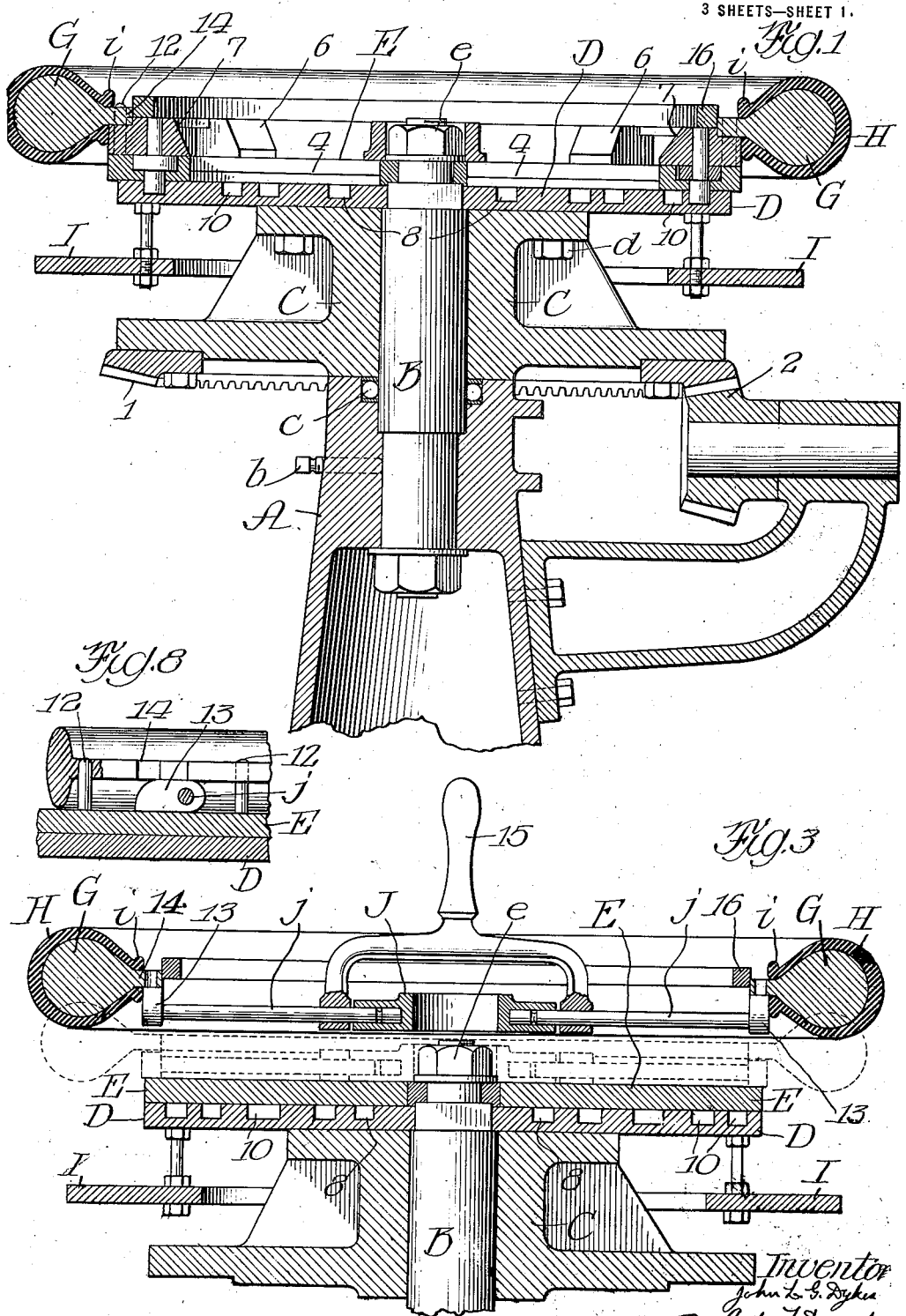
Figure 1 is a vertical section of a band-stretching machine embodying the principles of my invention.

It is obvious that the mandrel composed of the sections F and G with its inner flange 14 and with holes in said flange for the dowel-pins 12, can be made in any suitable or desired manner, and by various manufacturing methods. For example, as is well known, there are one-piece or continuous mandrels in use which have inner flanges, and these solid or one-piece mandrels can be divided into sections, in the manner shown, and their flanges can be bored to provide holes for said dowel-pins, whereby the ordinary or common one-piece mandrel can be converted into a sectional mandrel of the kind shown and described. When the mandrel is on the machine, the separable sections of the mandrel are unconnected except through the medium of the operating mechanism. The separable sections can be applied successively to the mechanism, each one being properly adjusted before another one is put in place. Referring to Figs. 1 and 3, it will be understood that the tire casing H is first U-shaped in cross section, when stretched by the expansion of the mandrel, but that after the mandrel and casing are compressed in the vulcanizing press, in the manner explained, the casing H then conforms to the mandrel in the manner shown, so that it is by the compression of the vulcanizing press that the band is made to assume the ultimate form necessary for the tire casing.

What I claim as my invention is:

1. In a machine for stretching bands of fabric and rubber into shape for pneumatic tires, the combination of a sectional mandrel to receive the band, each section of said mandrel being separated form and unconnected with the other sections, mechanism to operate the sections of said mandrel by radial movement of each section bodily to stretch the band thereon, having provisions whereby each section of said mandrel is independently attachable to and separable from said mechanism, thereby to permit the successive placing of the sections on said mechanism, and to permit removal of the entire mandrel with the stretched band thereon, so that a plurality of such mandrels can be used interchangeably on said machine, and means to temporarily retain the mandrel in the condition of maximum expansion thereof when removed from the machine with the stretched band thereon.

2. The combination specified in claim 1, and a device to lift the mandrel from the machine.

3. A structure as specified in claim 1, in which said mechanism comprises a disk provided with a plurality of cam-grooves on one surface thereof, means to connect each section of said mandrel with one of said cam-grooves, means to rotate said disk to shift the mandrel-sections, and radial guides for causing the mandrel-sections to move radially of said disk, said cam-grooves being adapted to move some of said mandrel-sections farther than the others.

4. A structure as specified in claim 1, in which the alternate mandrel-sections are beveled inside at their ends, in which the intermediate mandrel-sections have their ends beveled outside to wedge tightly between said alternate mandrel-sections when the mandrel is expanded, and in which said retaining-means comprises a ring adapted to fit within the mandrel.

5. A structure as specified in claim 1, in which said retaining-means comprising a ring-like member is adapted to fit concentrically within said mandrel.

6. In a machine for stretching bands, the combination of operating mechanism, and a plurality of sectional mandrels adapted to be used interchangeably with each other in operative relation to said mechanism to successively stretch the bands, the sections of each mandrel being separable and operable by said mechanism independently of each other, so that all of the sections are unconnected with each other except when they are connected together through the medium of said mechanism, and each section having its own individual connection with said mechanism, in combination with means to retain each mandrel in the condition of maximum expansion thereof when removed from the machine with the stretched band thereon.

7. The combination of claim 6, and a device applicable to said machine to remove said mandrels with the stretched bands thereon.

8. The combination of claim 6, and means including cams to force the mandrels upward from the top of the machine.

9. The combination of claim 1, and cams disposed in position to force the mandrel upward from the machine.

10. The combination of claim 1, and a unitary device which is applicable to and removable from said machine, provided with means to force the mandrel upward from the machine, and a handle to operate said device and for lifting it onto and off the machine.

11. In a machine for stretching bands of fabric and rubber to form pneumatic tires, the combination of a sectional annular mandrel for stretching the bands, rotary cam mechanism for advancing the sections of the mandrel radially and bodily and independently of each other into position to stretch the bands, and separable connections between the individual sections and said mechanism to permit removal of the mandrel with the stretched band thereon.

12. A structure as specified in claim 11, said mechanism including a rotary plate provided with a plurality of circular cam-grooves on the upper surface thereof, each of said grooves being eccentric to the axis of said mechanism.

13. A structure as specified in claim 11, said mechanism having a plurality of cam-grooves adapted to forcibly retract the mandrel-sections, as well as to forcibly advance the sections into stretching position, devices to engage said grooves, and radial guides for said devices.

14. The combination of a sectional mandrel, means to support a tire-band in position for stretching, with the tread portion of the band immediately outside of said mandrel, operating mechanism to expand the mandrel and thereby stretch and increase the diameter of said tread portion of the band, so that the rim portions of the band will fold toward each other upon the mandrel, said mandrel being detachably connected with said mechanism, and means to lift the mandrel in expanded condition and the stretched band thereon out of engagement with said mechanism.

15. The combination of a sectional mandrel for stretching a tire band, operating mechanism to support the mandrel in position to receive the previously formed band and for thereafter expanding the mandrel to stretch the band, and means to detachably connect said mandrel with said mechanism, so that said mandrel in fully expanded condition and while retained at the maximum diameter thereof and with the stretched band thereon is removable from said mechanism.

16. The combination of claim 15, as specified, in which said means include vertical pins on which the sections of the mandrel are removably held in position during the stretching operation.

17. The combination of claim 15, as specified, and means to retain the mandrel in expanded condition when removed with the stretched band thereon.

18. The combination of a sectional mandrel for stretching tire bands into shape for vulcanizing, and for use after each stretching operation in the vulcanizing of the stretched band thereon, mechanism to operate said mandrel, and to support the mandrel in position to receive the previously formed band, means to detachably connect the mandrel with said mechanism, so that the mandrel while in the condition of maximum expansion thereof and with the fully stretched band thereon is removable from said mechanism after the stretching operation, and means to control the operation of said mechanism, said mandrel being annular and comprising segmental sections which are separable after the mandrel is disconnected from said mechanism.

19. The combination of claim 18, as specified, and instrumentalities for exerting upward pressure to lift the expanded mandrel and stretched band upward from said mechanism.

20. In a machine for stretching bands of fabric and rubber into shape for pneumatic tires, the combination of a sectional mandrel to receive the band, mechanism to operate the sections of said mandrel to stretch the band thereon, having provisions whereby said mandrel is separable from said mechanism, thereby to permit removal of the mandrel with the stretched band thereon, so that a plurality of mandrels can be used interchangeably in said machine, means to retain the mandrel in expanded condition when removed from the machine, and a device to lift the mandrel from the machine.

21. In a machine for stretching bands of fabric and rubber into shape for pneumatic tires, the combination of a sectional mandrel to receive the band, mechanism to operate the sections of said mandrel to stretch the band thereon, having provisions whereby said mandrel is separable from said mechanism, thereby to permit removal of the mandrel with the stretched band thereon, so that a plurality of mandrels can be used interchangeably in said machine, means to retain the mandrel in expanded condition when removed from the machine, said mechanism comprising a disk provided with a plurality of cam-grooves on one surface thereof, means to connect each section of said mandrel with one of said cam-grooves, means to rotate said disk to shift the mandrel-sections, and radial guides for causing the mandrel-sections to move radially of said disk, said cam-grooves being adapted to move some of said mandrel-sections farther than the others.

22. In a machine for stretching bands of fabric and rubber into shape for pneumatic tires, the combination of a sectional mandrel to receive the band, mechanism to operate the sections of said mandrel to stretch the band thereon, having provisions whereby said mandrel is separable from said mechanism, thereby to permit removal of the mandrel with the stretched band thereon, so that a plurality of mandrels can be used interchangeably in said machine, means to retain the mandrel in expanded condition when removed from the machine, the alternate mandrel-sections being beveled inside at their ends, the intermediate mandrel-sections having their ends beveled outside to wedge tightly between said alternate mandrel-sections when the mandrel is expanded, and said retaining-means comprising a ring adapted to fit within the mandrel.

23. In a machine for stretching bands, the combination of operating mechanism, a plurality of stretching mandrels adapted to be used interchangeably with each other in operative relation to said mechanism to successively stretch the bands, and a device applicable to said machine to remove said mandrels with the stretched bands thereon.

24. In a machine for stretching bands, the combination of operating mechanism, a plurality of stretching mandrels adapted to be used interchangeably with each other in operative relation to said mechanism to successively stretch the bands, and means including cams to force the mandrels upward from the top of the machine.

25. In a machine for stretching bands of fabric and rubber into shape for pneumatic tires, the combination of a sectional mandrel to receive the band, mechanism to operate the sections of said mandrel to stretch the band thereon, having provisions whereby said mandrel is separable from said mechanism, thereby to permit removal of the mandrel with the stretched band thereon, so that a plurality of mandrels can be used interchangeably in said machine, means to retain the mandrel in expanded condition when removed from the machine, and cams disposed in position to force the mandrel upward from the machine.

26. In a machine for stretching bands of fabric and rubber into shape for pneumatic tires, the combination of a sectional mandrel to receive the band, mechanism to operate the sections of said mandrel to stretch the band thereon, having provisions whereby said mandrel is separable from said mechanism, thereby to permit removal of the mandrel with the stretched band thereon, so that a plurality of mandrels can be used interchangeably in said machine, means to retain the mandrel in expanded condition when removed from the machine, and a unitary device which is applicable to and removable from said machine, provided with means to force the mandrel upward from the machine, and a handle to operate said device and for lifting it onto and off the machine.

27. A mandrel for use in making pneumatic tire casings, comprising a plurality of unconnected and separable sections, each intermediate mandrel section being wedge-shaped, with the bevel-surfaces forming the wedge converging away from the axis of the mandrel, and each alternate section being beveled at the ends thereof so that the sections of the mandrel may be separately and loosely shaken or forced out of the finished tire casing, and each and every section of the mandrel having means to connect it with a machine for expanding the mandrel to maximum diameter.

28. A mandrel as specified in claim 27, and a ring for insertion concentrically therein, thereby to hold the sections of the mandrel in operative position.

29. A mandrel as specified in claim 27, the sections thereof being of such shape that the tire casing in cross-section will have a clencher-base of less width than the portion between the base and the tread.

30. A sectional annular mandrel for use in stretching and shaping tire bands to form tire casings, comprising a plurality of separable sections adapted to engage each other to provide tight joints between the sections, and an inner flange for each section, with dowel-pin holes in said flanges.

31. A structure as specified in claim 30, in combination with a ring to engage the inner edges of said flanges to maintain the mandrel sections in position within the stretched band.

32. A structure as specified in claim 30, in combination with mechanism having dowel-pins to engage said holes to operate the sections outwardly to stretch the band thereon.

33. In a tire band stretching machine, the combination of a plurality of mandrel sections adapted to fit together to provide an annular stretching and forming mandrel, a flange on the inner side of each section, radially movable slides, radial guides for said slides, vertically disposed dowel-pins carried by said slides, said flanges having holes for said dowel-pins, so that each section is detachable by lifting it upwardly from its allotted slide, mechanism to operate said slides to move the sections outward to stretch the band, and means to retain the sections in position after the mandrel with the stretched band thereon is removed from the machine.

34. In a tire band stretching machine, the combination of means for stretching the band to increase the diameter thereof, by stretching the tread portion of the band and leaving the edge portions unstretched, and mechanical provisions whereby the tire casing while thus held in maximum stretched condition by said means is removable bodily from the machine.

Signed by me at Chicago, Cook county, Illinois, this 12th day of September, 1917.

JOHN L. G. DYKES.